US011687079B2

(12) United States Patent
Bardapurkar et al.

(10) Patent No.: US 11,687,079 B2
(45) Date of Patent: Jun. 27, 2023

(54) METHODS, DEVICES, AND SYSTEMS FOR ANALYZING MOTION PLANS OF AUTONOMOUS VEHICLES

(71) Applicant: UATC, LLC, San Francisco, CA (US)

(72) Inventors: Sameer Bardapurkar, Pittsburgh, PA (US); Moslem Kazemi, Allison Park, PA (US); David McAllister Bradley, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 921 days.

(21) Appl. No.: 15/924,844

(22) Filed: Mar. 19, 2018

(65) Prior Publication Data

US 2019/0235506 A1 Aug. 1, 2019

Related U.S. Application Data

(60) Provisional application No. 62/622,233, filed on Jan. 26, 2018.

(51) Int. Cl.

| | |
|---|---|
| ***G05D 1/02*** | (2020.01) |
| ***G01C 21/34*** | (2006.01) |
| ***G05D 1/00*** | (2006.01) |
| ***G01C 21/36*** | (2006.01) |
| ***G01C 21/00*** | (2006.01) |

(52) U.S. Cl.

CPC ......... *G05D 1/0212* (2013.01); *G01C 21/005* (2013.01); *G01C 21/3453* (2013.01); *G01C 21/3626* (2013.01); *G05D 1/0055* (2013.01); *G05D 1/0246* (2013.01); *G05D 1/0257* (2013.01); *G05D 1/0291* (2013.01); *G05D 2201/0213* (2013.01)

(58) Field of Classification Search

CPC .. G05D 1/0212; G05D 1/0055; G05D 1/0246; G05D 1/0257; G05D 1/0291; G05D 2201/0213; G01C 21/3453; G01C 21/005; G01C 21/3626

See application file for complete search history.

(56) References Cited

U.S. PATENT DOCUMENTS

| | | | | |
|---|---|---|---|---|
| 10,593,074 B1 * | 3/2020 | Friedman | G06F 3/04842 | |
| 2006/0116816 A1 * | 6/2006 | Chao | G08G 1/09685 | 701/414 |
| 2007/0018811 A1 * | 1/2007 | Gollu | G06Q 10/087 | 340/8.1 |
| 2007/0078600 A1 * | 4/2007 | Fregene | G01S 13/933 | 701/301 |
| 2010/0124196 A1 * | 5/2010 | Bonar | H04W 16/16 | 370/329 |

(Continued)

FOREIGN PATENT DOCUMENTS

JP 2011059857 A * 3/2011

*Primary Examiner* — Thomas Ingram

(74) *Attorney, Agent, or Firm* — Dority & Manning, P.A.

(57) ABSTRACT

The present disclosure is directed to analyzing motion plans of autonomous vehicles. In particular, the methods, devices, and systems of the present disclosure can: receive data indicating a motion plan, of an autonomous vehicle through an environment, based at least in part on multiple different constraints of the environment; and determine, for each constraint of the multiple different constraints, a measure of an influence of the constraint on the motion plan.

22 Claims, 5 Drawing Sheets

106 Network(s)
108 Remote Computing System
10 Autonomous Vehicle
102 Computing System
104 Computing Device(s)
110 Positioning System
112 Processor(s)
114 Communication Interface(s)
116 Memory
118 Instructions
120 Data
122 Map Data
124 Sensor(s)
126 Vehicle Control(s)
128 Perception System
130 Prediction System
132 Motion Planning System
134 Vehicle Control System

(56) References Cited

U.S. PATENT DOCUMENTS

2013/0158772 A1* 6/2013 Swenson .............. G05D 1/0274 701/25
2017/0192431 A1* 7/2017 Foster .................. G05D 1/0088
2017/0356751 A1* 12/2017 Iagnemma ......... G01C 21/3691
2018/0024553 A1* 1/2018 Kong ................... G05D 1/0248 701/26
2018/0032082 A1* 2/2018 Shalev-Shwartz ........................... G01C 21/3602
2018/0284785 A1* 10/2018 Berntorp .............. G08G 1/0112

* cited by examiner

METHODS, DEVICES, AND SYSTEMS FOR ANALYZING MOTION PLANS OF AUTONOMOUS VEHICLES

PRIORITY CLAIM

This application claims priority to U.S. Patent Application Ser. No. 62/622,233, filed Jan. 26, 2018, and entitled "METHODS, DEVICES, AND SYSTEMS FOR ANALYZING MOTION PLANS OF AUTONOMOUS VEHICLES," the disclosure of which is incorporated by reference herein in its entirety.

FIELD

The present disclosure relates generally to autonomous vehicles. More particularly, the present disclosure relates to analyzing motion plans of autonomous vehicles.

BACKGROUND

An autonomous vehicle is a vehicle that is capable of sensing its environment and navigating with minimal or no human input. In particular, an autonomous vehicle can observe its surrounding environment using a variety of sensors and identify an appropriate path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for analyzing a motion plan of an autonomous vehicle. The method can include receiving data indicating a motion plan, of an autonomous vehicle through an environment, based at least in part on a plurality of different constraints of the environment. The method can include determining, for each constraint of the plurality of different constraints, a measure of an influence of the constraint on the motion plan.

Another example aspect of the present disclosure is directed to a system. The system can include one or more processors and a memory storing instructions that when executed by the one or more processors cause the system to perform operations. The operations can include receiving data indicating a motion plan of an autonomous vehicle through an environment. The motion can be based at least in part on a plurality of different constraints of the environment, and the motion plan can comprise a trajectory of the autonomous vehicle through the environment comprising a plurality of different points. The operations can include, for each point of the plurality of different points, determining, for each constraint of the plurality of different constraints, a measure of an influence of the constraint on the motion plan at the point.

A further example aspect of the present disclosure is directed to one or more non-transitory computer-readable media. The one or more non-transitory computer-readable media can comprise instructions that when executed by one or more computing devices cause the one or more computing devices to perform operations. The operations can comprise, for each autonomous vehicle of a plurality of different autonomous vehicles belonging to a fleet of autonomous vehicles: receiving, from the autonomous vehicle, data indicating a motion plan, of the autonomous vehicle through an environment, based at least in part on a plurality of different constraints of the environment; and determining, for each constraint of the plurality of different constraints, a measure of an influence of the constraint on the motion plan of the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
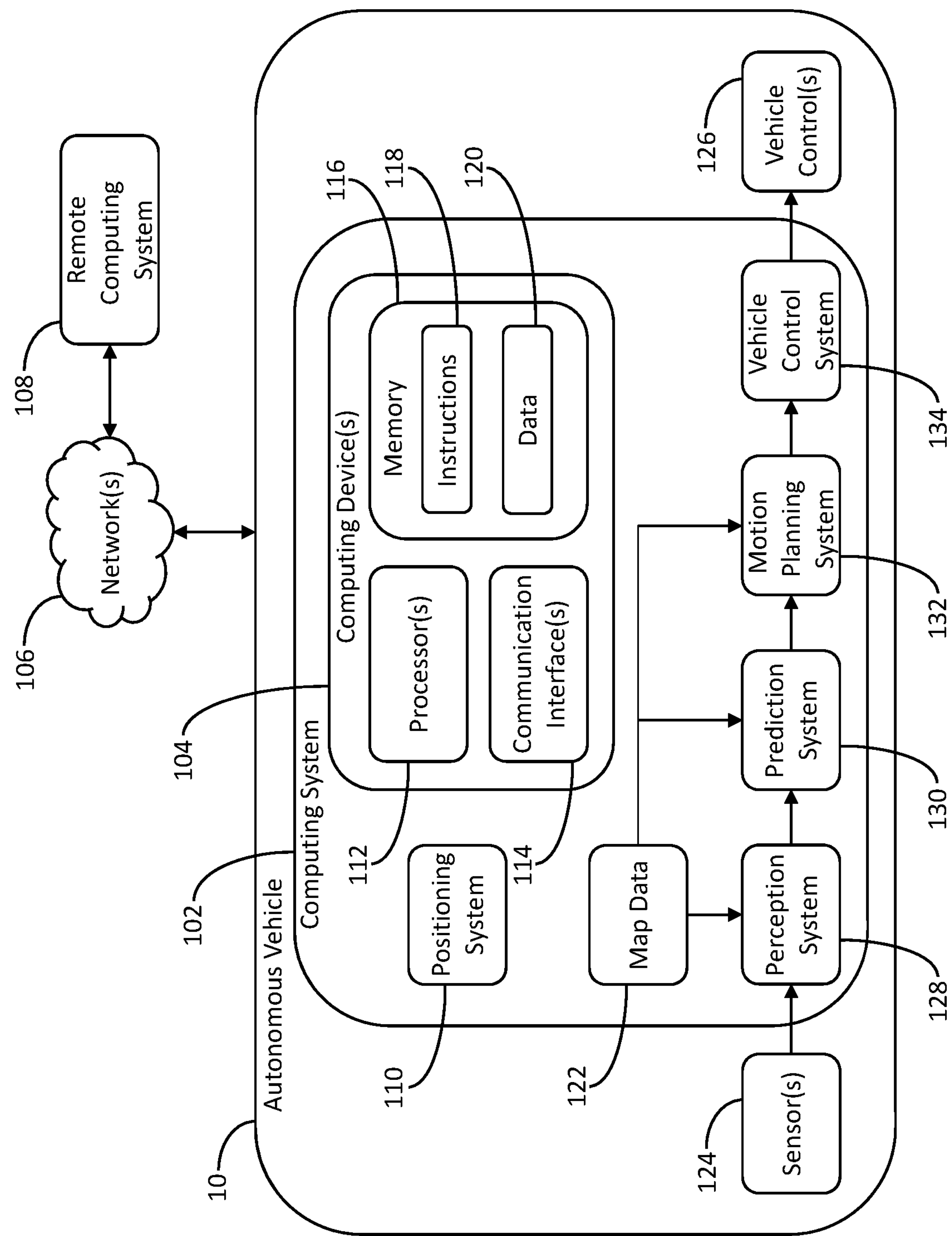
FIG. 1 depicts an example autonomous vehicle according to example embodiments of the present disclosure.

Example aspects of the present disclosure are directed to analyzing motion plans of autonomous vehicles. In particular, a computing system including one or more computing devices can receive data indicating a motion plan of an autonomous vehicle through an environment (e.g., through an intersection, down a street, and/or the like). The motion plan can have been generated, determined, selected, and/or the like (e.g., by the computing system, a different computing system, and/or the like) based at least in part on multiple different constraints of the environment. In accordance with aspects of the disclosure, the computing system can determine, for each of the constraints, a measure of an influence of the constraint on the motion plan. For example, the computing system can determine a measure of an influence of the constraint relative to each of the other constraints.

One or more of the computing device(s) can be physically located onboard the autonomous vehicle and can receive data indicating the motion plan; determine, for each constraint, a measure of an influence of the constraint on the motion plan; generate, for each constraint, data indicating the measure of the influence of the constraint on the motion plan; store, for each constraint, the data indicating the measure of the influence of the constraint on the motion plan; and/or the like. Additionally or alternatively, one or more of the computing device(s) can be distinct and remotely located from the autonomous vehicle and can (e.g., based at least in part on log data generated by the autonomous vehicle, and/or the like) receive data indicating the motion plan; determine, for each constraint, a measure of an influence of the constraint on the motion plan; generate, for each constraint, data indicating the measure of the influence of the constraint on the motion plan; store, for each constraint, the data indicating the measure of the influence of the constraint on the motion plan; and/or the like.

In some embodiments, the environment can include multiple different objects (e.g., that the autonomous vehicle can be required to navigate, contend with, and/or the like). For example, the environment can include stationary and/or moving objects, such as one or more vehicles, cyclists, motorcyclists, pedestrians, and/or the like. In some embodiments, the constraints can include the objects, and the computing system can determine, for each constraint, a measure of an influence of an object on the motion plan. For example, the constraints can include an oncoming vehicle, an adjacent vehicle, and/or the like, and the computing system can determine a measure of an influence of the oncoming vehicle on the motion plan, a measure of an influence of the adjacent vehicle on the motion plan, and/or the like.

Additionally or alternatively, the constraints can include multiple different actions the autonomous vehicle is instructed (e.g., based at least in part on one or more previous determinations by the computing system, a different computing system, and/or the like) to take with respect to the objects, and the computing system can determine, for each constraint, a measure of an influence of an action on the motion plan. For example, the autonomous vehicle can be instructed to pass an adjacent vehicle, ignore a vehicle to the rear of the autonomous vehicle, and/or the like, and the computing system can determine a measure of an influence of the action to pass the adjacent vehicle on the motion plan, a measure of an influence of the action to ignore the vehicle to the rear of the autonomous vehicle on the motion plan, and/or the like. Such actions can include actions instructing the autonomous vehicle to pass an object, ignore an object, queue behind an object, maintain a position relative to an object, maintain a distance between the autonomous vehicle and an object, avoid an object, yield to an object, and/or the like.

In some embodiments, the motion plan can include a trajectory of the autonomous vehicle (e.g., through the environment, and/or the like). The trajectory can include multiple different points along a path of the autonomous vehicle indicated by the motion plan. In some of such embodiments, the computing system can determine, for each constraint, a measure of an influence of the constraint on the motion plan at each of the points.

In some embodiments, the motion plan can be generated, determined, selected, and/or the like based at least in part on its cost. For example, each of the constraints can be associated with a cost, and the motion plan can be generated, determined, selected, and/or the like to optimize (e.g., minimize, and/or the like) the aggregate (e.g., total, and/or the like) of such constituent costs. The constituent costs can be determined in accordance with multiple different functions (e.g., associated with different types of objects, actions the autonomous vehicle is instructed to take with respect to objects, and/or the like) based at least in part on various inputs associated with the autonomous vehicle, the environment, and/or the like (e.g., one or more vehicle parameters, sensor data, determinations of a perception and/or prediction system of the autonomous vehicle, and/or the like). In some embodiments, the motion plan can be generated, determined, selected, and/or the like via an iterative process (e.g., a linear quadratic regulator (LQR), and/or the like) that generates, determines, selects, and/or the like an optimized (e.g., corresponding to a minimum total cost, and/or the like) plan (e.g., course of action, path, trajectory, and/or the like) for the autonomous vehicle with respect to the functions, inputs, and/or the like.

In some of such embodiments, the constraints can include the functions for determining the constituent costs, and the computing system can determine, for each constraint, a measure of an influence of a function on the motion plan. For example, the functions can include a function for determining a cost associated with passing an adjacent vehicle, a function for determining a cost associated with ignoring a vehicle to the rear of the autonomous vehicle, and/or the like, and the computing system can determine a measure of an influence of the function for determining the cost associated with passing the adjacent vehicle on the motion plan, a measure of an influence of the function for determining the cost associated with ignoring the vehicle to the rear of the autonomous vehicle on the motion plan, and/or the like.

In some embodiments, the constraints' influences on the motion plan can be determined based at least in part on data utilized in generating, determining, selecting, and/or the like the motion plan (e.g., one or more vehicle parameters, sensor data, determinations of a perception and/or prediction system of the autonomous vehicle, and/or the like), for example, a world state describing the environment. In some of such embodiments, the constraints' influences on the motion plan can be determined by replicating one or more portions of such data associated with one or more of the constraints and/or logic for determining one or more of the constraints (e.g., one or more functions for determining constituent costs, and/or the like). Such replications can be utilized to deterministically recover one or more influences (e.g., contributions, and/or the like) of these constraint(s) on the motion plan. In some embodiments, the constraints' influences on the motion plan can be determined by utilizing a class (e.g., as part of an object-oriented implementation, and/or the like) that inherits from a class utilized to generate, determine, select, and/or the like the motion plan (e.g., a class defining an LQR, and/or the like). For example, such a class could comprise a function (e.g., a function for determining a cost, and/or the like) analogous, similar, and/or the like to a function included in the class utilized to generate, determine, select, and/or the like the motion plan.

The computing system can generate, for display by a computing device, an interface (e.g., a graphical interface, and/or the like) indicating, for each constraint, the measure of the influence of the constraint on the motion plan. For example, the interface can include, text indicating the constraints' respective measures of influence on the motion plan, a listing of the constraints sorted by their respective measures of influence on the motion plan, and/or the like. Additionally or alternatively, the interface can depict a scene of the environment comprising elements associated with the constraints. For example, as indicated above, the constraints can include objects included in the environment, actions the autonomous vehicle is instructed to take with respect to such objects, and/or the like; the elements can depict, represent, correspond to, and/or the like the objects; and the interface can indicate (e.g., via patterns, shading, color, and/or the like) the objects' and/or their associated actions' respective measures of influence on the motion plan. Accordingly, the interface can identify one or more constraints with the greatest, most significant, and/or the like influence on the motion plan, which can enable a user to identify (e.g., triage, and/or the like) constraints that dictated, resulted in, and/or the like the motion plan. As indicated above, in some embodiments, the motion plan can include a trajectory of the autonomous vehicle through the environment. In some of such embodiments, the interface can depict the trajectory (e.g., within the scene, and/or the like). The trajectory can include multiple different points along a path of the autonomous vehicle indicated by the motion plan. User input (e.g., generated via manipulation of the interface, and/or the like) can select a point along the path, and responsive to the user input, the interface can be generated, modified, and/or the like to indicate the constraints' respective measures of influence on the motion plan at the selected point.

In some embodiments, a computing device for which the interface is generated for display by can be distinct and remotely located from the autonomous vehicle (e.g., associated with a technician remotely analyzing motion plans of the autonomous vehicle, and/or the like). In some of such embodiments, a computing system that includes the computing device for which the interface is generated for display by can receive, from the computing system that determines the measures of influence of the constraints on the motion plan, data indicating the measures of influence. Additionally or alternatively, a computing device for which the interface is generated for display by can be physically located onboard the autonomous vehicle (e.g., for use by a technician in or proximate to the vehicle in analyzing motion plans of the autonomous vehicle, and/or the like).

In some embodiments, the autonomous vehicle can be part of a fleet of autonomous vehicles, and a computing system (e.g., a computing system including computing devices physically located onboard one or more of the vehicles, computing devices distinct and remotely located from the vehicles, and/or the like) can, for each vehicle of the fleet: receive data indicating a motion plan, of the vehicle through an environment, generated, determined, selected, and/or the like based at least in part on multiple different constraints of the environment; and determine, for each constraint, a measure of an influence of the constraint on the motion plan of the vehicle.

The methods, devices, and systems described herein can provide a number of technical effects and benefits. For example, the methods, devices, and systems described herein can enable analysis and comparison of motion plans generated by autonomous vehicles to facilitate understanding of why an autonomous vehicle behaved in a particular manner when faced with a given situation. Such analysis and comparison can support the development, refinement, diagnostics, and/or the like of logic (e.g., artificial intelligence, and/or the like) configured to generate, determine, select, and/or the like motion plans for autonomous vehicles.

With reference now to the Figures, example embodiments of the present disclosure will be discussed in further detail.

FIG. 1 depicts an example autonomous vehicle according to example embodiments of the present disclosure. Referring to FIG. 1, autonomous vehicle 10 can be capable of sensing its environment, navigating its environment with minimal or no human input, and/or the like. Autonomous vehicle 10 can be a ground-based autonomous vehicle (e.g., car, truck, bus, and/or the like), an air-based autonomous vehicle (e.g., airplane, drone, helicopter, and/or the like), and/or other type of vehicle (e.g., watercraft, and/or the like). Autonomous vehicle 10 can include one or more sensors 124, computing system 102, and one or more vehicle controls 126. Computing system 102 can assist in controlling autonomous vehicle 10. For example, computing system 102 can receive data generated by sensor(s) 124, attempt to comprehend an environment surrounding autonomous vehicle 10 by performing various processing techniques on the data generated by sensor(s) 124, generate, determine, select, and/or the like a motion plan for navigating autonomous vehicle 10 through, within, and/or the like such surrounding environment, and/or the like. Computing system 102 can interface with vehicle control(s) 126 to operate autonomous vehicle 10 (e.g., in accordance with the motion plan, and/or the like).

Computing system 102 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable autonomous vehicle 10 (e.g., computing system 102, computing device(s) 104, and/or the like) to communicate with one or more computing systems, computing devices, and/or the like distinct from autonomous vehicle 10 (e.g., computing system 108, and/or the like). Memory 116 can include (e.g., store, and/or the like) instructions 118 and data 120. When executed by processor(s) 112, instructions 118 can cause autonomous vehicle 10 (e.g., computing system 102, computing device(s) 104, and/or the like) to perform one or more operations, functions, and/or the like described herein. Data 120 can include, represent, and/or the like information associated with such operations, functions, and/or the like, data generated by sensor(s) 124, and/or the like.

Computing system 102 can be physically located onboard autonomous vehicle 10, and computing system 108 can be distinct and/or remotely located from autonomous vehicle 10. One or more networks 106 (e.g., wired networks, wireless networks, and/or the like) can interface autonomous vehicle 10 (e.g., computing system 102, computing device(s) 104, and/or the like) with computing system 108, which can include one or more computing devices analogous to computing device(s) 104, one or more components (e.g., memory, processors, communication interfaces, and/or the like) analogous to those of computing device(s) 104, and/or the like. Irrespective of attribution described or implied herein, unless explicitly indicated otherwise, the operations, functions, and/or the like described herein can be performed by computing system(s) 102 and/or 108 (e.g., by computing system 102, by computing system 108, by a combination of computing systems 102 and 108, and/or the like).

Computing system 102 can include positioning system 110, which can include one or more devices, circuitry, and/or the like for analyzing, approximating, determining, and/or the like one or more geographic positions of autonomous vehicle 10. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 102 can include perception system 128, prediction system 130, and motion planning system 132, which can cooperate to perceive a dynamic environment surrounding autonomous vehicle 10, generate, determine, select, and/or the like a motion plan for autonomous vehicle 10, and/or the like.

Perception system 128 can receive data from sensor(s) 124, which can be coupled to or otherwise included within autonomous vehicle 10. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding autonomous vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wave-length, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding autonomous vehicle 10. For example, map data 122 can provide information regarding: the identity and location of different travelways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic control data (e.g., the location and/or instructions of signage, traffic lights, other traffic control devices, and/or the like); other map data providing information that can assist computing system 102 in comprehending, perceiving, and/or the like an environment surrounding autonomous vehicle 10, its relationship thereto, and/or the like.

Perception system 128 can (e.g., based at least in part on data received from sensor(s) 124, map data 122, and/or the like) identify one or more objects proximate to autonomous vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, bicycle, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion planning system 132 can generate, determine, select, and/or the like a motion plan for autonomous vehicle 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion planning system 132 can generate, determine, select, and/or the like a motion plan for autonomous vehicle 10 that it determines (e.g., based at least in part on one or more operation parameters, and/or the like) best navigates autonomous vehicle 10 relative to the object(s). Motion planning system 132 can provide the motion plan to vehicle control system 134, which can directly and/or indirectly control autonomous vehicle 10 via vehicle control(s) 126 (e.g., one or more actuators, devices, and/or the like that control gas, power flow, steering, braking, and/or the like) in accordance with the motion plan.

Perception system 128, prediction system 130, motion planning system 132, and/or vehicle control system 134 can include logic utilized to provide functionality described herein. Perception system 128, prediction system 130, motion planning system 132, and/or vehicle control system 134 can be implemented in hardware (e.g., circuitry, and/or the like), firmware, software configured to control one or more processors, one or more combinations thereof, and/or the like. For example, instructions 118, when executed by processor(s) 112, can cause autonomous vehicle 10 (e.g., computing system 102, computing device(s) 104, and/or the like) to implement functionality of perception system 128, prediction system 130, motion planning system 132, and/or vehicle control system 134 described herein.

Figure 2:
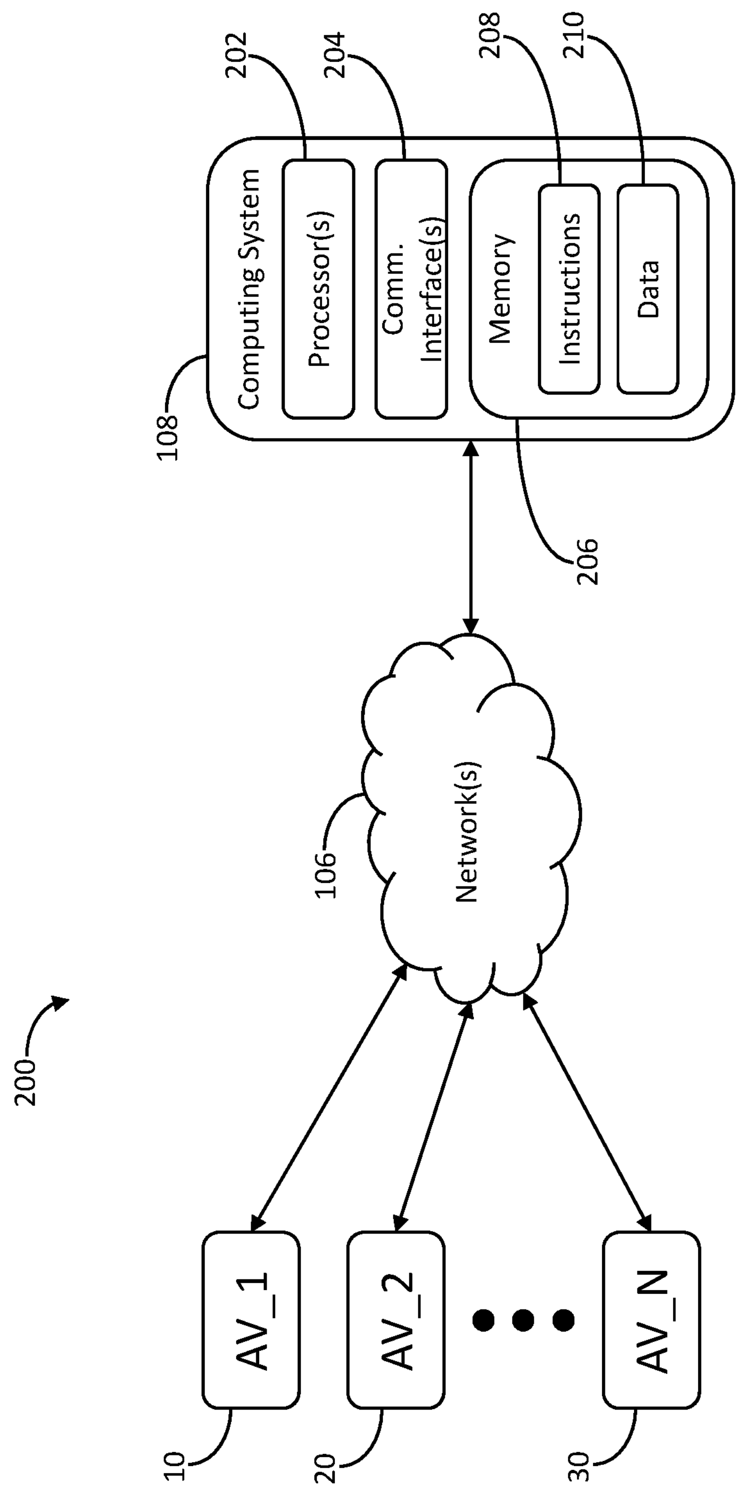
FIG. 2 depicts an example operating environment according to example embodiments of the present disclosure.

FIG. 2 depicts an example operating environment according to example embodiments of the present disclosure. Referring to FIG. 2, environment 200 can include autonomous vehicles 10, 20, and/or 30. It will be appreciated that autonomous vehicles 20 and/or 30 can include one or more components described above with respect to autonomous vehicle 10. Environment 200 can include network(s) 106, which can interface autonomous vehicle(s) 10, 20, and/or 30 with one another and/or computing system 108. Computing system 108 can include one or more processor(s) 202, one or more communication interfaces 204, and memory 206 (e.g., one or more hardware components for storing executable instructions, data, and/or the like). Communication interface(s) 204 can enable computing system 108 to communicate with autonomous vehicles 10, 20, and/or 30. Memory 206 can include (e.g., store, and/or the like) instructions 208 and data 210. When executed by processor(s) 202, instructions 208 can cause computing system 108 to perform one or more operations, functions, and/or the like described herein. Data 210 can include, represent, and/or the like information associated with such operations, functions, and/or the like. Irrespective of attribution described or implied herein, unless explicitly indicated otherwise, the operations, functions, and/or the like described herein can be performed by one or more computing systems of autonomous vehicles 10, 20, and/or 30 (e.g., computing system 102, and/or the like) and/or computing system 108 (e.g., by computing system 102, by a computing system of autonomous vehicle 20, by a computing system of autonomous vehicle 30, by computing system 108, by a combination of one or more of computing system 102, a computing system of autonomous vehicle 20, a computing system of autonomous vehicle 30, computing system 108, and/or the like).

Figure 3:
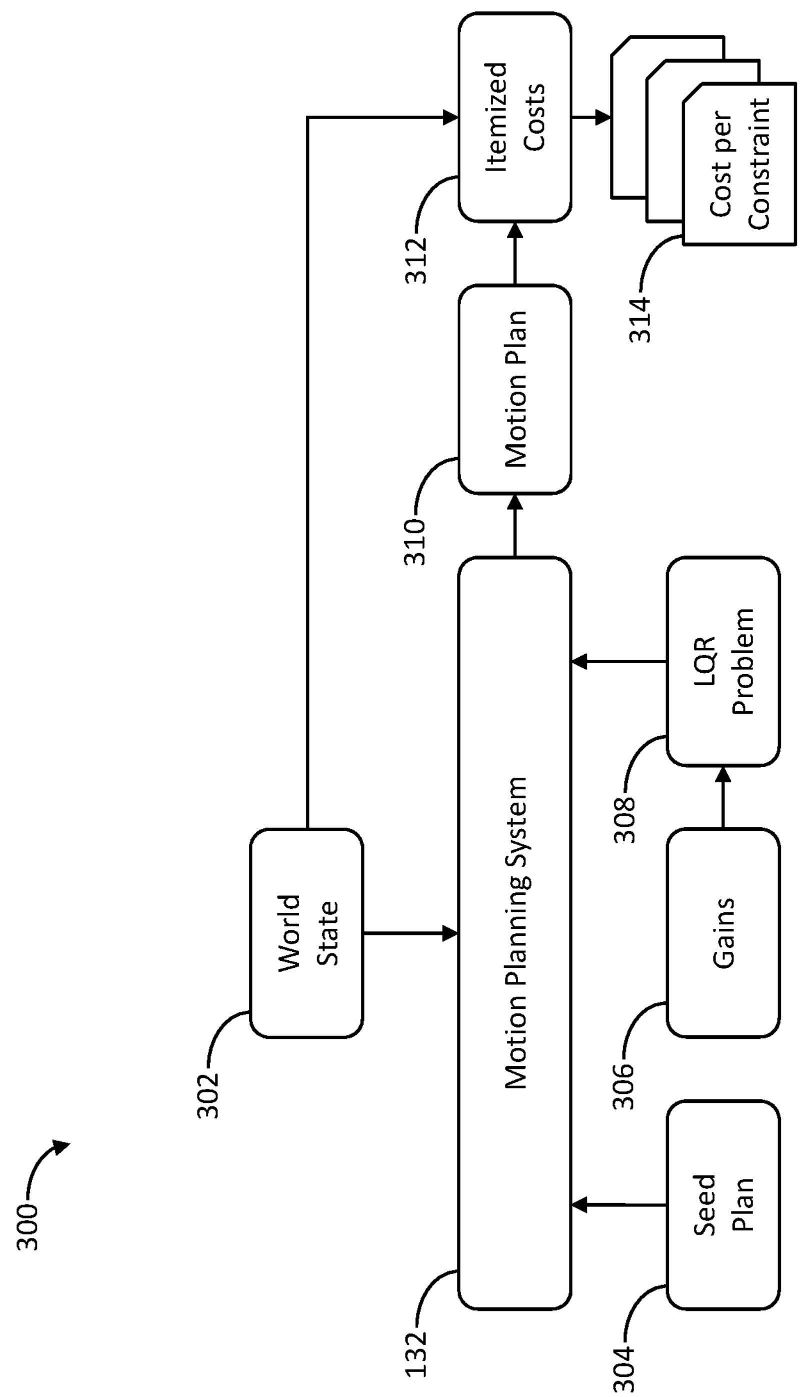
FIG. 3 depicts an example architecture according to example embodiments of the present disclosure.

FIG. 3 depicts an example architecture according to example embodiments of the present disclosure. Referring to FIG. 3, architecture 300 can include motion planning system 132. Motion planning system 132 can generate, determine, select, and/or the like motion plan 310 for autonomous vehicle 10 through an environment (e.g., through an intersection, down a street, and/or the like). Motion planning system 132 can generate, determine, select, and/or the like motion plan 310 based at least in part on multiple different constraints of the environment. For example, motion planning system 132 can generate, determine, select, and/or the like motion plan 310 based at least in part on world state 302, which can include, for example, state data of object(s) provided by perception system 128, predicted future location(s) of object(s) provided by prediction system 130, and/or the like. Motion plan 310 can also be generated, determined, selected, and/or the like based on seed plan 304, which can be based, for example, on map data 122, data from positioning system 110, and/or the like. In accordance with aspects of the disclosure, a computing system (e.g., computing systems 102 and/or 108, and/or the like) can receive data indicating motion plan 310 (e.g., from motion planning system 132, and/or the like) and can determine, for each of the multiple different constraints of the environment upon which motion plan 310 is at least in part based, an influence of the constraint on motion plan 310. For example, the computing system can determine a measure of an influence of the constraint relative to each of the other constraints.

In some embodiments, the environment can include multiple different objects (e.g., that autonomous vehicle 10 can be required to navigate, contend with, and/or the like). For example, the environment can include stationary and/or moving objects, such as one or more vehicles, cyclists, motorcyclists, pedestrians, and/or the like. In some embodiments, the constraints can include the objects, and the computing system can determine, for each constraint, a measure of an influence of an object on motion plan 310. For example, the constraints can include an oncoming vehicle, an adjacent vehicle, and/or the like, and the computing system can determine a measure of an influence of the oncoming vehicle on motion plan 310, a measure of an influence of the adjacent vehicle on motion plan 310, and/or the like.

Additionally or alternatively, the constraints can include multiple different actions autonomous vehicle 10 is instructed (e.g., based at least in part on one or more previous determinations by the computing system, a different computing system, and/or the like) to take with respect to the objects, and the computing system can determine, for each constraint, a measure of an influence of an action on motion plan 310. For example, autonomous vehicle 10 can be instructed to pass an adjacent vehicle, ignore a vehicle to the rear of autonomous vehicle 10, and/or the like, and the computing system can determine a measure of an influence of the action to pass the adjacent vehicle on motion plan 310, a measure of an influence of the action to ignore the vehicle to the rear of autonomous vehicle 10 on motion plan 310, and/or the like. Such actions can include actions instructing autonomous vehicle 10 to pass an object, ignore an object, queue behind an object, maintain a position relative to an object, maintain a distance between autonomous vehicle 10 and an object, avoid an object, yield to an object, and/or the like.

In some embodiments, motion plan 310 can include a trajectory of autonomous vehicle 10 (e.g., through the environment, and/or the like). The trajectory can include multiple different points along a path of autonomous vehicle 10 indicated by motion plan 310. In some of such embodiments, the computing system can determine, for each constraint, a measure of an influence of the constraint on motion plan 310 at each of the points.

In some embodiments, motion plan 310 can be generated, determined, selected, and/or the like based at least in part on its cost. For example, each of the constraints can be associated with a cost, and motion plan 310 can be generated, determined, selected, and/or the like to optimize (e.g., minimize, and/or the like) the aggregate (e.g., total, and/or the like) of such constituent costs. The constituent costs can be determined in accordance with multiple different functions (e.g., associated with different types of objects, actions the autonomous vehicle is instructed to take with respect to objects, and/or the like) based at least in part on various inputs associated with autonomous vehicle 10, the environment, and/or the like (e.g., one or more vehicle parameters, data generated by, received from, and/or the like, sensor(s) 124, determinations of perception system 128 and/or prediction system 130, and/or the like). In some embodiments, motion plan 310 can be generated, determined, selected, and/or the like via iterative process 308 (e.g., a linear quadratic regulator (LQR), and/or the like) that generates, determines, selects, and/or the like an optimized (e.g., corresponding to a minimum total cost, and/or the like) plan (e.g., course of action, path, trajectory, and/or the like) for autonomous vehicle 10 with respect to the functions, inputs, and/or the like. Process 308 can be based at least in part on gains 306, which can include weighting, tuning, and/or the like factors (e.g., coefficients, and/or the like) assigned to the functions, their inputs, and/or the like. Such factors can be predetermined, static, and/or dynamic (e.g., based at least in part on one or more vehicle parameters, data generated by, received from, and/or the like, sensor(s) 124, determinations of perception system 128 and/or prediction system 130, and/or the like).

In some of such embodiments, the constraints can include the functions for determining the constituent costs, and the computing system (e.g., via itemized-costs-determination process 312, and/or the like) can determine, for each constraint, a measure of an influence of a function on motion plan 310 (e.g., cost per constraint 314, and/or the like). For example, the functions can include a function for determining a cost associated with passing an adjacent vehicle, a function for determining a cost associated with ignoring a vehicle to the rear of autonomous vehicle 10, and/or the like, and the computing system can determine a measure of an influence of the function for determining the cost associated with passing the adjacent vehicle on motion plan 310, a measure of an influence of the function for determining the cost associated with ignoring the vehicle to the rear of autonomous vehicle 10 on motion plan 310, and/or the like.

In some embodiments, the constraints' influences on motion plan 310 can be determined based at least in part on data utilized in generating, determining, selecting, and/or the like motion plan 310 (e.g., one or more vehicle parameters, data generated by, received from, and/or the like, sensor(s) 124, determinations of perception system 128 and/or prediction system 130, and/or the like), for example, world state 302. In some of such embodiments, the constraints' influences on motion plan 310 can be determined by replicating one or more portions of such data associated with one or more of the constraints and/or logic for determining one or more of the constraints (e.g., one or more functions for determining constituent costs, and/or the like). Such replications can be utilized to deterministically recover one or more influences (e.g., contributions, and/or the like) of these constraint(s) on motion plan 310. In some embodiments, the constraints' influences on motion plan 310 can be determined by utilizing a class (e.g., as part of an object-oriented implementation, and/or the like) that inherits from a class utilized to generate, determine, select, and/or the like motion plan 310, for example, a class utilized by process 308 (e.g., a class defining an LQR, and/or the like). For example, such a class could comprise a function (e.g., a function for determining a cost, and/or the like) analogous, similar, and/or the like to a function included in the class utilized to generate, determine, select, and/or the like motion plan 310.

The computing system can generate, for display by a computing device, an interface (e.g., a graphical interface, and/or the like) indicating, for each constraint, the measure of the influence of the constraint on motion plan 310. In some embodiments, a computing device (e.g., a computing device of computing system 108, and/or the like) for which the interface is generated for display by can be distinct and remotely located from autonomous vehicle 10 (e.g., associated with a technician remotely analyzing motion plans of autonomous vehicle 10, and/or the like). In some of such embodiments, a computing system (e.g., computing system 108, and/or the like) that includes the computing device for which the interface is generated for display by can receive, from the computing system (e.g., computing system 102, and/or the like) that determines the measures of influence of the constraints on motion plan 310, data indicating the measures of influence. Additionally or alternatively, a computing device (e.g., a computing device of computing system 102, and/or the like) for which the interface is generated for display by can be physically located onboard autonomous vehicle 10 (e.g., for use by a technician in or proximate to autonomous vehicle 10 in analyzing motion plans of autonomous vehicle 10, and/or the like).

Figure 4:
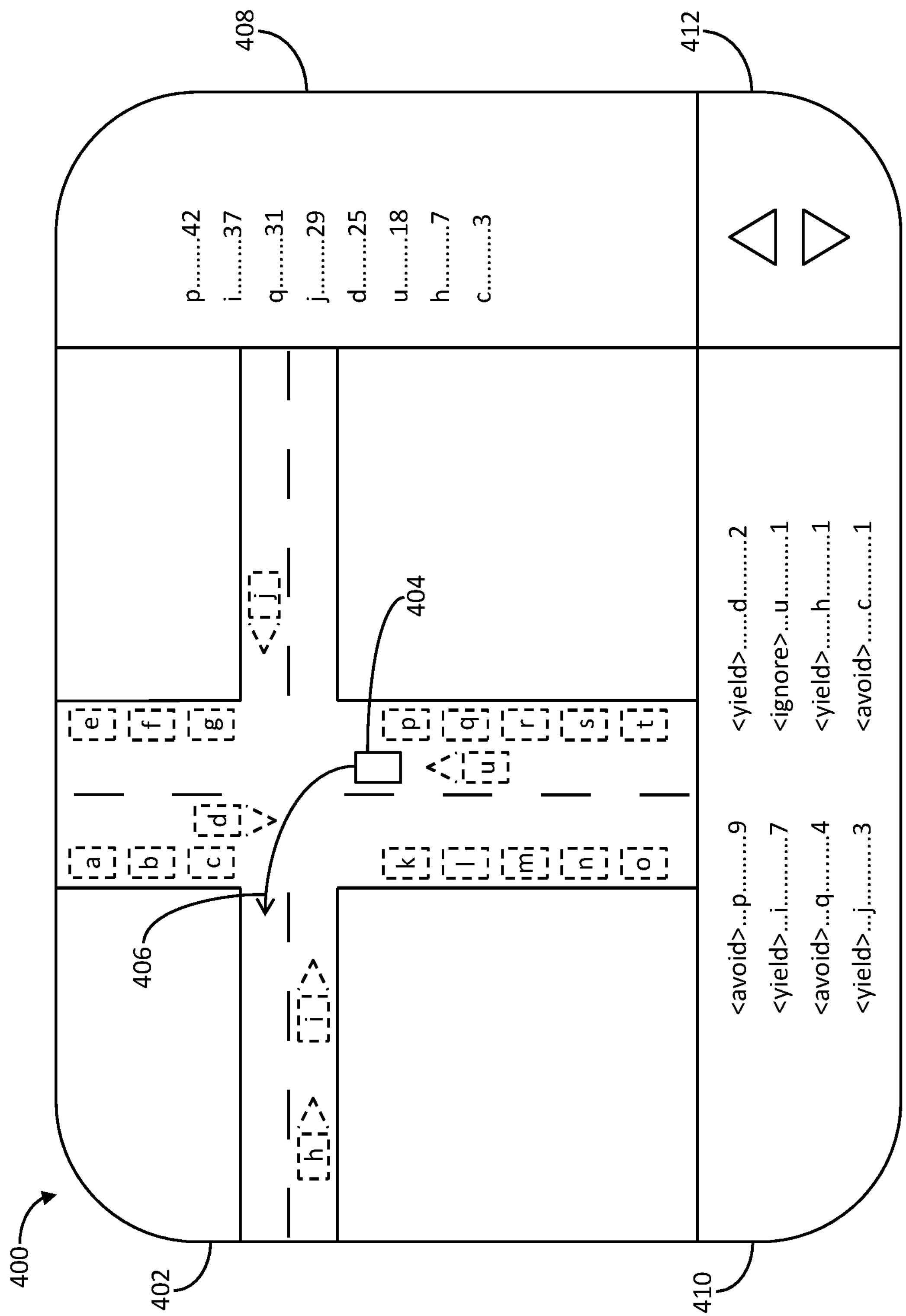
FIG. 4 depicts an example interface according to example embodiments of the present disclosure.

FIG. 4 depicts an example interface according to example embodiments of the present disclosure. Referring to FIG. 4, interface 400 can include portion 402, which can depict a scene of the environment and include element 404 depicting autonomous vehicle 10 within the environment. The scene can include elements associated with the constraints, for example, one or more elements depicting a vehicle to the rear of autonomous vehicle 10 (e.g., vehicle "u," and/or the like), a vehicle approaching autonomous vehicle 10 (e.g., vehicle "d," and/or the like), one or more vehicles traveling on a road autonomous vehicle 10 is approaching (e.g., vehicles "h," "i," "j," and/or the like), and/or one or more vehicles parked alongside a road on which autonomous vehicle 10 is traveling (e.g., vehicles "a," "b," "c," "e," "f," "g," "k," "l," "m," "n," "o," "p," "q," "r," "s," "t," and/or the like). Interface 400 can also include portions 408 and 410, which can include text indicating the constraints' respective measures of influence on motion plan 310. For example, portion 408 can include a listing of objects included in the environment and their respective measures of influence on motion plan 310. Similarly, portion 410 can include a listing of actions autonomous vehicle 10 is instructed to take with respect to such objects and their respective measures of influence on motion plan 310. Such listings can be ordered, sorted, and/or the like, for example, based on the measures of influence on motion plan 310, and/or the like.

Interface 400 can further indicate (e.g., via patterns, shading, color, and/or the like), for example, as part of the scene depicted by portion 402, the objects' and/or their associated actions' respective measures of influence on motion plan 310. Accordingly, interface 400 can identify one or more constraints with the greatest, most significant, and/or the like influence on motion plan 310, which can enable a user to identify (e.g., triage, and/or the like) constraints that dictated, resulted in, and/or the like motion plan 310. As indicated above, in some embodiments, motion plan 310 can include a trajectory of autonomous vehicle 10 through the environment. In some of such embodiments, interface 400 can include element 406 depicting the trajectory (e.g., within the scene, and/or the like). The trajectory can include multiple different points along a path of autonomous vehicle 10 indicated by motion plan 310. User input (e.g., generated via manipulation of one or more elements included in portion 412 of interface 400, and/or the like) can select a point along the path, and responsive to the user input, interface 400 can be generated, modified, and/or the like to indicate the constraints' respective measures of influence on motion plan 310 at the selected point (e.g., portions 408 and/or 410 can be refreshed, and/or the like).

Figure 5:
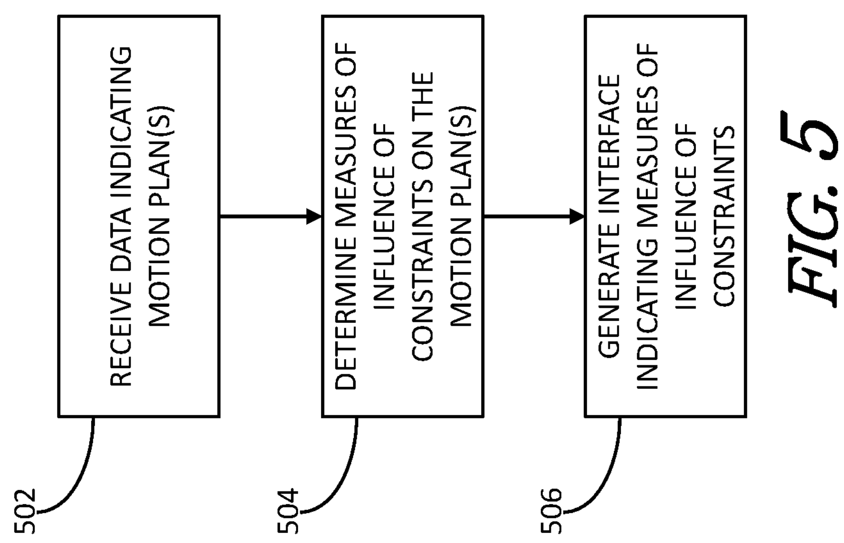
FIG. 5 depicts an example method according to example embodiments of the present disclosure.

FIG. 5 depicts an example method according to example embodiments of the present disclosure. Referring to FIG. 5, at (502), a computing system can receive data indicating a motion plan, of an autonomous vehicle through an environment, based at least in part on multiple different constraints of the environment. For example, a computing system (e.g., computing systems 102 and/or 108, and/or the like) can receive data indicating motion plan 310. At (504), the computing system can determine, for each of the multiple different constraints, a measure of an influence of the constraint on the motion plan. For example, the computing system can determine, for each of multiple different constraints upon which motion plan 310 is at least in part based, a measure of an influence of the constraint on motion plan 310. At (506), the computing system can generate an interface indicating, for each constraint of the multiple different constraints, the measure of the influence of the constraint on the motion plan. For example, the computing system can generate (e.g., for display by a computing device of computing systems 102 and/or 108, and/or the like) interface 400.

In some embodiments, autonomous vehicle 10 can be part of a fleet of autonomous vehicles (e.g., including autonomous vehicles 20 and/or 30, and/or the like), and a computing system (e.g., one or more computing systems of autonomous vehicles 10, 20, and/or 30 (e.g., computing system 102, and/or the like) and/or computing system 108, and/or the like) can, for each vehicle of the fleet: receive data indicating a motion plan, of the vehicle through an environment, generated, determined, selected, and/or the like based at least in part on multiple different constraints of the environment; and determine, for each constraint, a measure of an influence of the constraint on the motion plan of the vehicle.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for analyzing a motion plan of an autonomous vehicle, the method comprising:

receiving data indicating a motion plan comprising at least one trajectory of an autonomous vehicle through an environment, wherein the at least one trajectory comprises a plurality of different points, wherein the motion plan is generated, determined, or selected based at least in part on a plurality of different constraints associated with the environment;

determining for at least one point of the plurality of different points, a sub measure of an influence of at least one of the plurality of different constraints on the motion plan at the at least one point, wherein a measure of the influence of the at least one constraint is indicative of a respective contribution of the at least one constraint to a generation, a determination, or a selection of the motion plan;

refining one or more instructions associated with the generation, the determination, or the selection of the motion plan based on the measure of the influence of the at least one constraint; and instructing the autonomous vehicle to move in accordance with one or more motion plans that are generated, determined, or selected based on the one or more refined instructions.

2. The computer-implemented method of claim 1, wherein determining the sub measure of the influence of the at least one constraint at the at least one point comprises determining a respective measure of a respective influence of the at least one constraint relative to one or more other constraints of the plurality of different constraints.

3. The computer-implemented method of claim 1, wherein:

the environment comprises a plurality of different objects;

one or more of the plurality of different constraints are associated with the plurality of different objects; and determining the sub measure of the influence of the at least one constraint at the at least one point comprises determining a contribution of at least one object of the plurality of different objects to the generation, the determination, or the selection of the motion plan.

4. The computer-implemented method of claim 1, wherein:

the environment comprises a plurality of different objects;

one or more of the plurality of different constraints are associated with a plurality of different actions the autonomous vehicle is instructed to take with respect to the plurality of different objects; and determining the sub measure of the influence of the at least one constraint at the at least one point comprises determining a contribution of at least one action of the plurality of different actions to the generation, the determination, or the selection of the motion plan.

5. The computer-implemented method of claim 4, wherein the plurality of different actions instruct the autonomous vehicle to one or more of pass an object of the plurality of different objects, ignore an object of the plurality of different objects, queue behind an object of the plurality of different objects, maintain a position relative to an object of the plurality of different objects, maintain a distance between the autonomous vehicle and an object of the plurality of different objects, avoid an object of the plurality of different objects, or yield to an object of the plurality of different objects.

6. The computer-implemented method of claim 1, wherein:

the motion plan is one or more of generated, determined, or selected based at least in part on its cost;

the plurality of different constraints are associated with a plurality of different functions for determining constituent costs of the motion plan; and determining the sub measure of the influence of the at least one constraint at the at least one point comprises determining a contribution of at least one function of the plurality of different functions to the generation, the determination, or the selection of the motion plan.

7. The computer-implemented method of claim 1, wherein determining the sub measure of the influence of the at least one constraint comprises determining, based at least in part on data utilized in one or more of the generating, the determining, or the selecting of the motion plan, the sub measure of the influence of the constraint.

8. The computer-implemented method of claim 7, wherein determining the sub measure of the influence of the at least one constraint comprises replicating at least a portion of the data utilized in one or more of the generating, the determining, or the selecting of the motion plan.

9. The computer-implemented method of claim 8, wherein determining the sub measure of the influence of the at least one constraint comprises deterministically recovering, based at least in part on a replication of at least the portion of the data utilized in one or more of the generating, the determining, or the selecting of the motion plan, a contribution of the constraint to the generation, the determination, or the selection of the motion plan.

10. The computer-implemented method of claim 1, comprising generating, for display by a computing device, a user interface, wherein the user interface indicates, for each respective constraint of the plurality of different constraints, the respective measure of the respective influence of the respective constraint on the motion plan.

11. The computer-implemented method of claim 10, wherein generating the user interface comprises generating an interface depicting a scene of the environment comprising a plurality of different elements associated with the plurality of different constraints.

12. The computer-implemented method of claim 10, wherein:

generating the user interface comprises generating an interface depicting the at least one trajectory.

13. The computer-implemented method of claim 1, wherein the motion plan is generated, determined, or selected through an interactive linear quadratic regulator based on the plurality of different constraints.

14. The computer-implemented method of claim 1, wherein providing, through the user interface, the data indicative of the at least one constraint and the measure of the influence of the at least one constraint on the motion plan comprises:

receiving, through the user interface, user input indicative of a selection of the at least one point by a user; and in response to the user input, providing data indicative of the at least one constraint and the sub measure of the influence of the at least one constraint on the motion plan at the at least one point.

15. An autonomous vehicle control system for controlling an autonomous vehicle, the autonomous vehicle control system comprising:

one or more processors; and one or more non-transitory computer-readable media storing instructions that are executable by the one or more processors to cause the autonomous vehicle control system to perform operations, the operations comprising:

receiving data indicating a motion plan comprising at least one trajectory of an autonomous vehicle through an environment, wherein the at least one trajectory comprises a plurality of different points, wherein the motion plan is generated, determined, or selected based at least in part on a plurality of different constraints associated with the environment;

determining for at least one point of the plurality of different points, a sub measure of an influence of at least one of the plurality of different constraints on the motion plan at the at least one point, wherein a measure of the influence of the at least one constraint is indicative of a respective contribution of the at least one constraint to a generation, a determination, or a selection of the motion plan;

refining one or more instructions associated with the generation, the determination, or the selection of the motion plan based on the measure of the influence of the at least one constraint; and instructing the autonomous vehicle to move in accordance with one or more motion plans that are generated, determined, or selected based on the one or more refined instructions.

16. The autonomous vehicle control system of claim 15, wherein determining the sub measure of the influence of the at least one constraint at the at least one point comprises determining a respective measure of a respective influence of the at least one constraint relative to one or more other constraints of the plurality of different constraints.

17. The autonomous vehicle control system of claim 15, wherein:

the environment comprises a plurality of different objects;

one or more of the plurality of different constraints are associated with the plurality of different objects; and determining the sub measure of the influence of the at least one constraint at the at least one point comprises determining a contribution of at least one object of the plurality of different objects to the generation, the determination, or the selection of the motion plan.

18. The autonomous vehicle control system of claim 15, wherein:

the environment comprises a plurality of different objects;

one or more of the plurality of different constraints are associated with a plurality of different actions the autonomous vehicle is instructed to take with respect to the plurality of different objects; and determining the sub measure of the influence of the at least one constraint at the at least one point comprises determining a contribution of at least one action of the plurality of different actions to the generation, the determination, or the selection of the motion plan.

19. The autonomous vehicle control system of claim 18, wherein the plurality of different actions instruct the autonomous vehicle to one or more of pass an object of the plurality of different objects, ignore an object of the plurality of different objects, queue behind an object of the plurality of different objects, maintain a position relative to an object of the plurality of different objects, maintain a distance between the autonomous vehicle and an object of the plurality of different objects, avoid an object of the plurality of different objects, or yield to an object of the plurality of different objects.

20. One or more non-transitory computer-readable media storing instructions that are executable by one or more processors to cause an autonomous vehicle control system to perform operations, the operations comprising:

receiving data indicating a motion plan comprising at least one trajectory of an autonomous vehicle through an environment, wherein the at least one trajectory comprises a plurality of different points, wherein the motion plan is generated, determined, or selected based at least in part on a plurality of different constraints associated with the environment;

determining for at least one point of the plurality of different points, a sub measure of an influence of at least one of the plurality of different constraints on the motion plan at the at least one point, wherein a measure of the influence of the at least one constraint is indicative of a respective contribution of the at least one constraint to a generation, a determination, or a selection of the motion plan;

refining one or more instructions associated with the generation, the determination, or the selection of the motion plan based on the measure of the influence of the at least one constraint; and instructing the autonomous vehicle to move in accordance with one or more motion plans that are generated, determined, or selected based on the one or more refined instructions.

21. The one or more non-transitory computer-readable media of claim 20, wherein determining the sub measure of the influence of the at least one constraint at the at least one point comprises determining a respective measure of a respective influence of the at least one constraint relative to one or more other constraints of the plurality of different constraints.

22. The one or more non-transitory computer-readable media of claim 20, wherein:

the environment comprises a plurality of different objects;

one or more of the plurality of different constraints are associated with a plurality of different actions the autonomous vehicle is instructed to take with respect to the plurality of different objects; and determining the sub measure of the influence of the at least one constraint at the at least one point comprises determining a contribution of at least one action of the plurality of different actions to the generation, the determination, or the selection of the motion plan.

* * * * *